US012762466B2

(12) United States Patent
Seki et al.

(10) Patent No.: US 12,762,466 B2
(45) Date of Patent: Oct. 13, 2026

(54) LEARNING APPARATUS AND LEARNING METHOD

(71) Applicant: DENSO TEN Limited, Kobe (JP)

(72) Inventors: Ryusuke Seki, Kobe (JP); Yasutaka Okada, Kobe (JP); Yuki Katayama, Kobe (JP); Rei Hiromi, Kobe (JP); Aoi Ogishima, Tokyo (JP)

(73) Assignee: DENSO TEN Limited, Kobe (JP)

( * ) Notice: Subject to any disclaimer, the term of this patent is extended or adjusted under 35 U.S.C. 154(b) by 1241 days.

(21) Appl. No.: 17/687,019

(22) Filed: Mar. 4, 2022

(65) Prior Publication Data

US 2023/0054706 A1 Feb. 23, 2023

(30) Foreign Application Priority Data

Aug. 19, 2021 (JP) ................................. 2021-133805
Aug. 19, 2021 (JP) ................................. 2021-133806

(51) Int. Cl.
*G06N 20/00* (2019.01)

(52) U.S. Cl.
CPC .................................... *G06N 20/00* (2019.01)

(58) Field of Classification Search
CPC ........ G06N 20/00; G06N 3/084; G06N 3/096; G06N 3/045
See application file for complete search history.

(56) References Cited

U.S. PATENT DOCUMENTS

2018/0268292 A1* 9/2018 Choi .................... G06V 10/454
2019/0034764 A1* 1/2019 Oh ...................... G06F 18/2148
2020/0134506 A1* 4/2020 Wang ..................... G06N 3/088
2022/0121855 A1* 4/2022 Farhadi .................. G06N 3/045
2022/0207431 A1* 6/2022 Park ...................... G06F 18/214
2022/0335303 A1* 10/2022 Haidar ................... G06N 3/096
2022/0366678 A1* 11/2022 Ishii ..................... G06V 10/776
2023/0206069 A1 6/2023 Zhang et al.

FOREIGN PATENT DOCUMENTS

CN 112183718 A 1/2021
JP 2020071883 A 5/2020
WO 2020161797 A1 8/2020

OTHER PUBLICATIONS

Wang et al. ("IDK Cascades: Fast Deep Learning by Learning not to Overthink", NPL, 2018) (Year: 2018).*
Yang et al. ("Snapshot Distillation: Teacher-Student Optimization in One Generation", NPL, 2019) (Year: 2019).*
Gou et al. ("Knowledge Distillation: A Survey") (Year: 2015).*
Dec. 17, 2024 Office Action issued in Japanese Patent Application No. 2021-133806.

* cited by examiner

*Primary Examiner* — Imad Kassim
(74) *Attorney, Agent, or Firm* — Oliff PLC

(57) ABSTRACT

A learning apparatus for training a student model with a teacher model includes a processor. The processor computes the performance difference between the teacher and student models. The processor makes at least one of a determination, based on the performance difference, of whether to use the teacher model and a determination, based on the performance difference, of whether to change the weight coefficient in calculating the loss in the student model.

7 Claims, 7 Drawing Sheets

LEARNING APPARATUS AND LEARNING METHOD

This application is based on Japanese Patent Applications Nos. 2021-133805 and 2021-133806 filed on Aug. 19, 2021, the contents of both of which are hereby incorporated by reference.

BACKGROUND OF THE INVENTION

1. Field of the Invention

The present invention relates to learning apparatuses and learning methods.

2. Description of Related Art

One known learning method for deep learning is knowledge distillation (see, for example, WO2020/161797 and JP-A-2020-71883). In knowledge distillation, a large-scale teacher model with a large number of parameters is used to train a student model with a small number of parameters. Knowledge distillation helps reduce model size while minimizing a drop in model performance.

SUMMARY OF THE INVENTION

With a learning method employing knowledge distillation, in the latter stage of learning when student model performance comes close teacher model performance, the student model performance may be saturated, making it impossible to achieve a satisfactory improvement in performance by knowledge distillation. Also, using a teacher model with excessively high performance may make it impossible to achieve a satisfactory improvement in student model performance.

With a learning method employing knowledge distillation, in a late stage of learning, due to a difference in feature space between the teacher and student models, making a feature map of the student model close to a feature map of the teacher model may adversely influence the learning by the student model, and the effect may be so adverse as to degrade the performance of the student model.

With a learning method employing knowledge distillation, training the student model by using the teacher model consistently regardless of the magnitude of the inference error of the teacher model has may lead to, if the teacher model has a large inference error, the student model being trained incorrectly. That is, disregarding the inference error of the teacher model in training the student model may degrade the performance of the student model.

In view of the problems discussed above, an object of the present invention is to provide a technology that enables appropriate training of a student model in deep learning employing knowledge distillation.

A learning apparatus according to an illustrative embodiment of the present invention is one for training a student model with a teacher model. The learning apparatus includes a processor, and this processor computes the performance difference between the teacher and student models. The processor then makes at least one of a determination, based on the performance difference, of whether to use the teacher model and a determination, based on the performance difference, of whether to change the weight coefficient in calculating the loss in the student model.

DETAILED DESCRIPTION OF PREFERRED EMBODIMENTS

Hereinafter, illustrative embodiments of the present invention will be described specifically with reference to the accompanying drawings.

Figure 1:
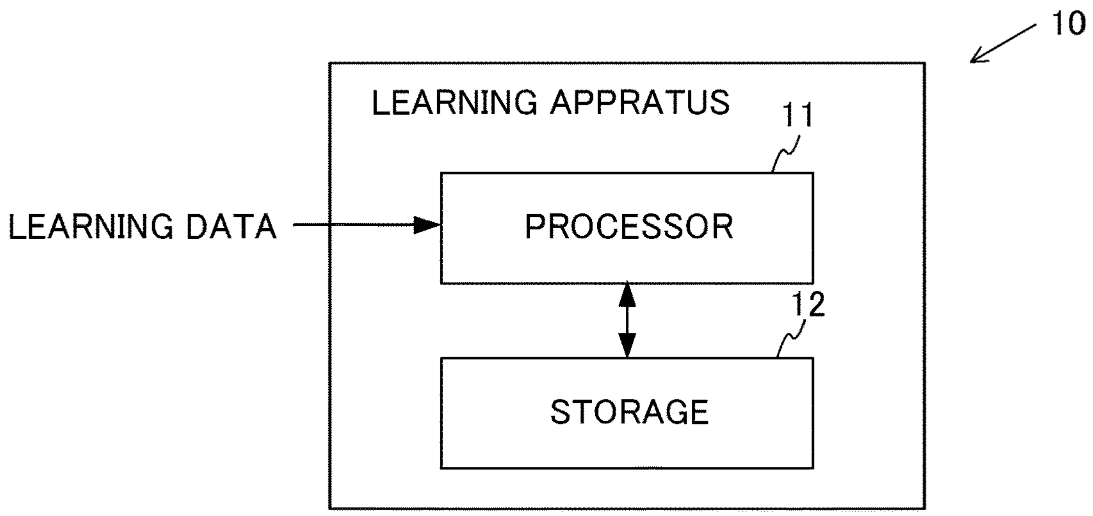
FIG. 1 is a block diagram showing a hardware configuration of a learning apparatus.

1. First Embodiment: FIG. 1 is a block diagram showing the hardware configuration of a learning apparatus 10 according to a first embodiment of the present invention. The learning apparatus 10 is a learning apparatus for machine learning, and employs knowledge distillation as a learning method. In the following description, knowledge distillation is often referred to simply as "distillation". The learning apparatus 10 is a learning apparatus for training a student model with a teacher model. The learning apparatus 10 carries out a learning method by which the student model is trained with the teacher model. Specifically the learning apparatus 10 subjects the student model to learning using learning data and the teacher model. In this embodiment, the learning apparatus 10 trains the student model by using a plurality of teacher models.

In this embodiment, learning data is input to the learning apparatus 10. The learning data is learning data with correct answer labels. The learning apparatus 10 has a teacher model and a student model. The teacher model is a large-scale deep neural network with a large number of parameters, and is an already learned model. The student model is a small-scale deep neural network with a smaller number of parameters than the teacher model. The student model is a model that is yet to be subjected to learning (training).

As shown in FIG. 1, the learning apparatus 10 includes a processor 11 and a storage 12. The storage 12 stores the teacher model and the student model. The teacher model includes learned parameters. The student model includes parameters to be subjected to updating through learning. In this embodiment, the teacher model actually comprises a plurality of teacher models, and the storage 12 stores the plurality of teacher models.

The processor 11 carries out a function of performing inference with respect to the learning data based on the teacher models, and performing inference with respect to the learning data based on the student model. The processor 11 carries out a function of updating the parameters of the student model in such a way as to reduce the error between the results of inference based on the teacher model and the results of inference of the student model. Instead of results of inference, an intermediate-layer feature map may be used.

Figure 2:
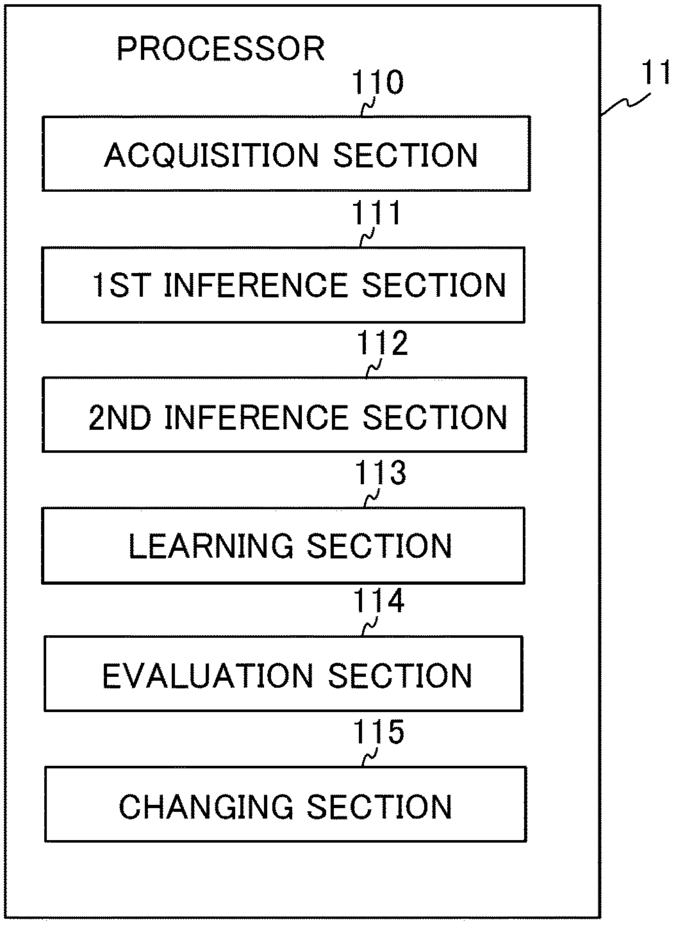
FIG. 2 is a block diagram showing a functional configuration of a processor provided in a learning apparatus according to a first embodiment.

FIG. 2 is a block diagram showing the functional configuration of the processor 11 provided in the learning apparatus 10 according to the first embodiment of the present invention. The functions of the processor 11 are carried out by the processor 11 performing arithmetic operations according to a program stored in the storage 12. As shown in FIG. 2, in this embodiment, the processor 11 includes, as its functional blocks, an acquisition section 110, a first inference section 111, a second inference section 112, a learning section 113, an evaluation section 114, and a changing section 115. In other words, the learning apparatus 10 includes an acquisition section 110, a first inference section 111, a second inference section 112, a learning section 113, an evaluation section 114, and a changing section 115. The acquisition section 110 acquires learning data.

The first inference section 111 performs inference with respect to the input learning data by using the learned teacher model. The function of the first inference section 111 is carried out by the processor 11 reading in the teacher model stored in the storage 12. The inference yields an inference result as a finial result of inference, a feature map as an intermediate output, or the like. In this embodiment, the learning data is image data, and the first inference section 111 performs object detection with respect to the input image data. The result of inference by the first inference section 111 includes identifications of the types and locations of objects. Object types include, for example, pedestrian, bicycle, automobile, traffic signal, and the like. Locations are identified by use of bounding boxes.

The second inference section 112 performs inference with respect to the input learning data by using the student model that is the target of training based on the teacher model. The function of the second inference section 112 is carried out by the processor 11 reading in the student model stored in the storage 12. The inference yields an inference result as a final result of inference, a feature map as an intermediate output, or the like. The parameters of the student model are updated regularly through leaning. In this embodiment, as described above, the learning data is image data, and the second inference section 112 performs object detection with respect to the input image data. The result of inference by the second inference section 112 includes, as with the first inference section 111, identifications of the types and locations of objects.

The learning section 113 computes the loss (distillation loss Ldstl) in the student model from the teacher model. The loss (distillation loss Ldstl) from the teacher model is the error, between the teacher and student models, in an inference result or in an intermediate-layer feature map (intermediate output). Based on such an error, a loss function can easily be derived by use of a known technology.

In this embodiment, the distillation loss Ldstl is the error between a feature map of the teacher model and a feature map of the student model. The distillation loss Ldstl may be, for example, an L2 loss that is given by expression (1) below. The distillation loss Ldstl, however, may be other than an L2 loss; it may instead be, for example, a KL divergence that represents the loss in output distribution between the teacher and student models.

$$Ldstl = \frac{\sum_{i=1}^{n}\left(\overset{s}{fxi} - \overset{t}{fxi}\right)^2}{n} \tag{1}$$

In expression (1), n represents the total number of samples (pieces of data), fxis represents the output of the student model for sample xi, fxit represents the output of the teacher model for sample xi.

The learning section 113 also computes the loss in the student model from the learning data. Specifically, the learning section 113 computes the error (loss) in the student model that is specific to a learning task with respect to correct answer labels in the learning data. In this embodiment, the learning task is object detection, and the learning task-specific Luq includes, for example, a classification loss Lcls and a bounding box regression loss Lbbox. In this embodiment, the learning task-specific Luq is computed, for example, by expression (2) below.

Expression (2) below assumes the use of YOLO as one example of an object detection algorism. In YOLO, an input image is divided into a grid with S×S tiles, and for each tile, predictions are made of the center coordinates (x, y) and the width and height scales (w, h) of B rectangular regions each with a predetermined aspect ratio as well as the probability (C) of presence of an object in those rectangular regions. Moreover, if any object is present in any of the rectangular regions, a prediction is also made of the posterior probability p(C) that indicates the class to which the object belongs. In YOLO, predictions of a rectangular region, the probability of presence of an object, and the posterior probability of a class are integrated into a single loss function.

$$\begin{aligned} Luq = {} & \lambda_{coord}\sum_{i=0}^{S^2}\sum_{j=0}^{B}1_{ij}^{obj}\left[\left(xi - xi^{truth}\right)^2 + \left(yi - yi^{truth}\right)^2\right] + \\ & \lambda_{coord}\sum_{i=0}^{S^2}\sum_{j=0}^{B}1_{ij}^{obj}\left[\left(\sqrt{wi} - \sqrt{wi^{truth}}\right)^2 + \left(\sqrt{hi} - \sqrt{hi^{truth}}\right)^2\right] + \\ & \sum_{i=0}^{S^2}\sum_{j=0}^{B}1_{ij}^{obj}\left(Ci - Ci^{truth}\right)^2 + \lambda_{noobj}\sum_{i=0}^{S^2}\sum_{j=0}^{B}1_{ij}^{noobj}\left(Ci - Ci^{truth}\right)^2 + \\ & \sum_{i=0}^{S^2}1_{i}^{obj}\sum_{c\in classes}\left(pi(c) - pi^{truth}(c)\right)^2 \end{aligned} \tag{2}$$

Here, a variable with no suffix is a predicted value, and a variable suffixed with "truth" is a correct answer. The symbols λcoord and λnoobj represent coefficients. In expression (2), the first and second terms represent the loss functions related to the center coordinates and size of a rectangular region. In expression (2), the third and fourth terms represent the loss functions related to the probability of object presence. In expression (2), the fifth term represents the loss function related to the posterior probability of a class.

The learning section 113 subjects the student model to learning in such a way as to minimize the loss L calculated by use of the loss in the student model from the teacher model (i.e., the distillation loss Ldstl) and the loss in the student model from the learning data (i.e., the task-specific Luq). Specifically, the learning section 113 updates the parameters of the student model by error backpropagation.

The loss L calculated by use of the loss from the teacher model and the loss from the learning data can be calculated, for example, by expression (3) below. In expression (3), λ represents a weight coefficient. The weight coefficient λ is a coefficient for adjusting the balance between the loss from the learning data and the loss from the teacher model. In this embodiment, the weight coefficient λ is a constant.

$$L = Luq + \lambda \cdot Ldstl \quad (3)$$

The evaluation section 114 computes the difference in performance (performance difference) between the teacher and student models. As described above, in this embodiment, performance is the performance of object detection. According to this embodiment, it is possible to create, by knowledge distillation, a high-performance learned model capable of fast object detection.

Specifically, the evaluation section 114 calculates the performance difference by using mAP (mean average precision) as an evaluation index for an object detection task. That is, the evaluation section 114 computes the mAP of the student model, and calculates its difference from the mAP of the teacher model. Here, the mAP of the teacher model may be calculated each time it is required or may be previously stored in the storage 12. In a case where the learning task is not object detection, an evaluation index different from mAP can be used. For example, in a case where the learning task is pixel segmentation, mIoU (mean intersection over union) can be used as the performance evaluation index.

Figure 3:
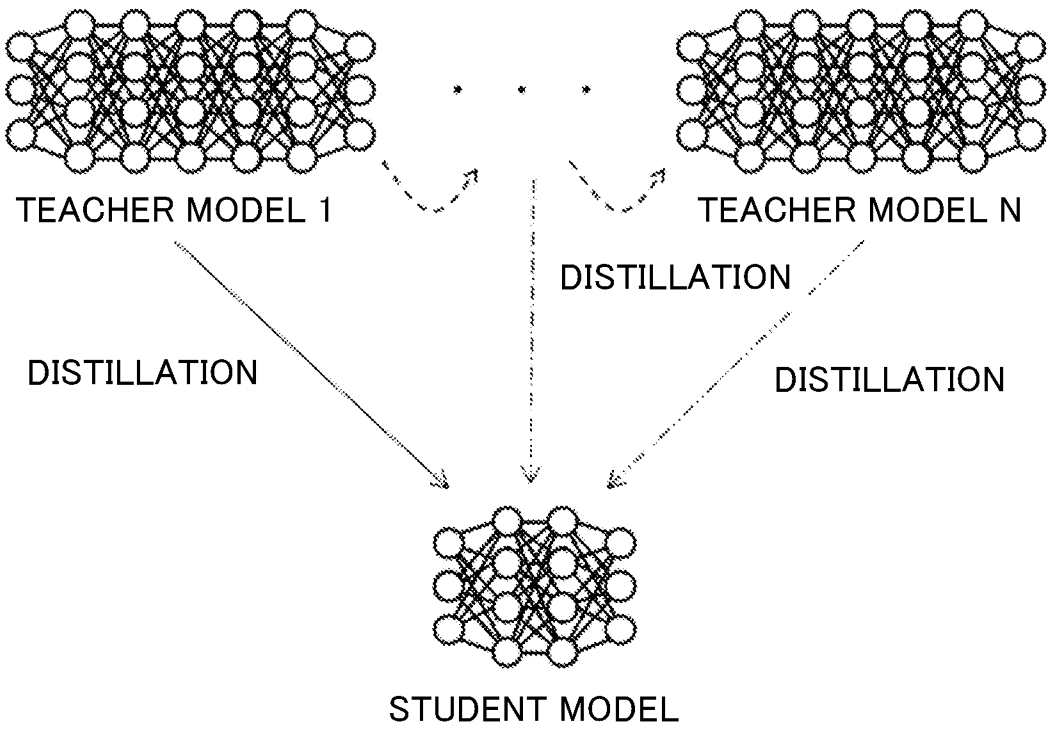
FIG. 3 is a schematic diagram illustrating a configuration for changing teacher models.

The changing section 115 changes the teacher model based on the performance difference between the teacher and student models. FIG. 3 is a schematic diagram illustrating a configuration for changing teacher models. As shown in FIG. 3, in this embodiment, previously prepared is not one teacher model but a plurality of teacher models. In FIG. 3, N>1, the plurality of teacher models differ in performance. The teacher model that is used to train the student model is changed from one to another in accordance with the performance difference between the teacher and student models.

With this configuration, when the performance of the student model comes close to the performance of the teacher model, the teacher model can be changed to one with higher performance, with which to continue to train the student model. This, compared with a configuration where only one teacher model is used to train the student model, makes it possible to improve the performance of the student model. Moreover, it is possible to change the performance of the teacher model gradually in accordance with the performance of the student model, and thus to appropriately train the student model.

In FIG. 3, as the number of the teacher model increases, the performance of the teacher model increases. That is, in the example shown in FIG. 3, when the performance difference between the teacher and student models becomes smaller than a predetermined threshold value, the changing section 115 changes the teacher model used to train the student model to one with higher performance than the one currently used. The predetermined threshold value can be, for example, any value that is determined by trial and error.

Figure 4:
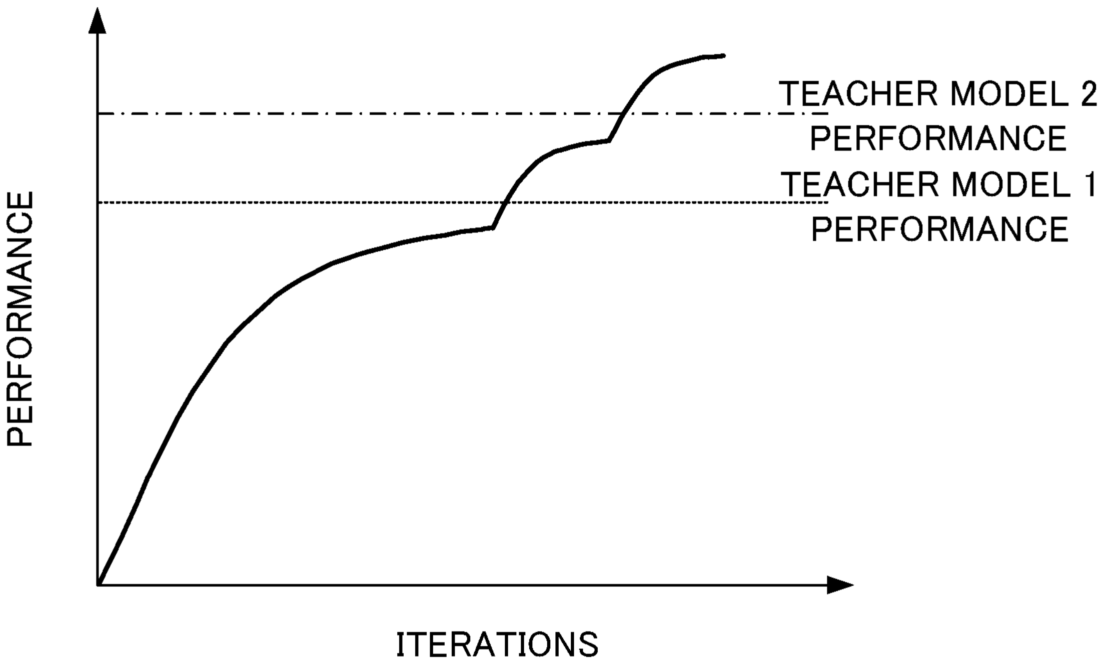
FIG. 4 is a schematic diagram showing how the performance of a student model changes when it is trained on the learning apparatus according to the first embodiment.

FIG. 4 is a schematic diagram showing how the performance of the student model changes when it is trained on the learning apparatus 10 according to the first embodiment of the present invention. In FIG. 4, the horizontal axis represents (the number of) iterations, which specifically is the number of times that the parameters of the student model are updated. In FIG. 4, the vertical axis represents performance, which for example is the detection rate of detection target objects.

As shown in FIG. 4, when, as a result of training using teacher model 1, i.e., the first teacher model, the performance of student model comes close to that of teacher model 1, training is continued with the teacher model changed to teacher model 2 with higher performance than teacher model 1. Likewise, when the performance of student model comes close to that of teacher model 2, training is continued with the teacher model changed to teacher model 3 with higher performance than teacher model 2. This is repeated the number of times equal to the number (N) of previously prepared teacher models, As described above, with this configuration, the student model starts to be trained by use of a teacher model with performance that suits the performance of the student model; as the performance of the student model improves, the performance of the teacher model used in the training is raised gradually. This, compared with a configuration where the student model is trained by use of a teacher model with high performance from the beginning, makes it possible to appropriately improve the performance of the student model. Moreover, with the configuration described above, it is possible to efficiently train the student model.

Figure 5:
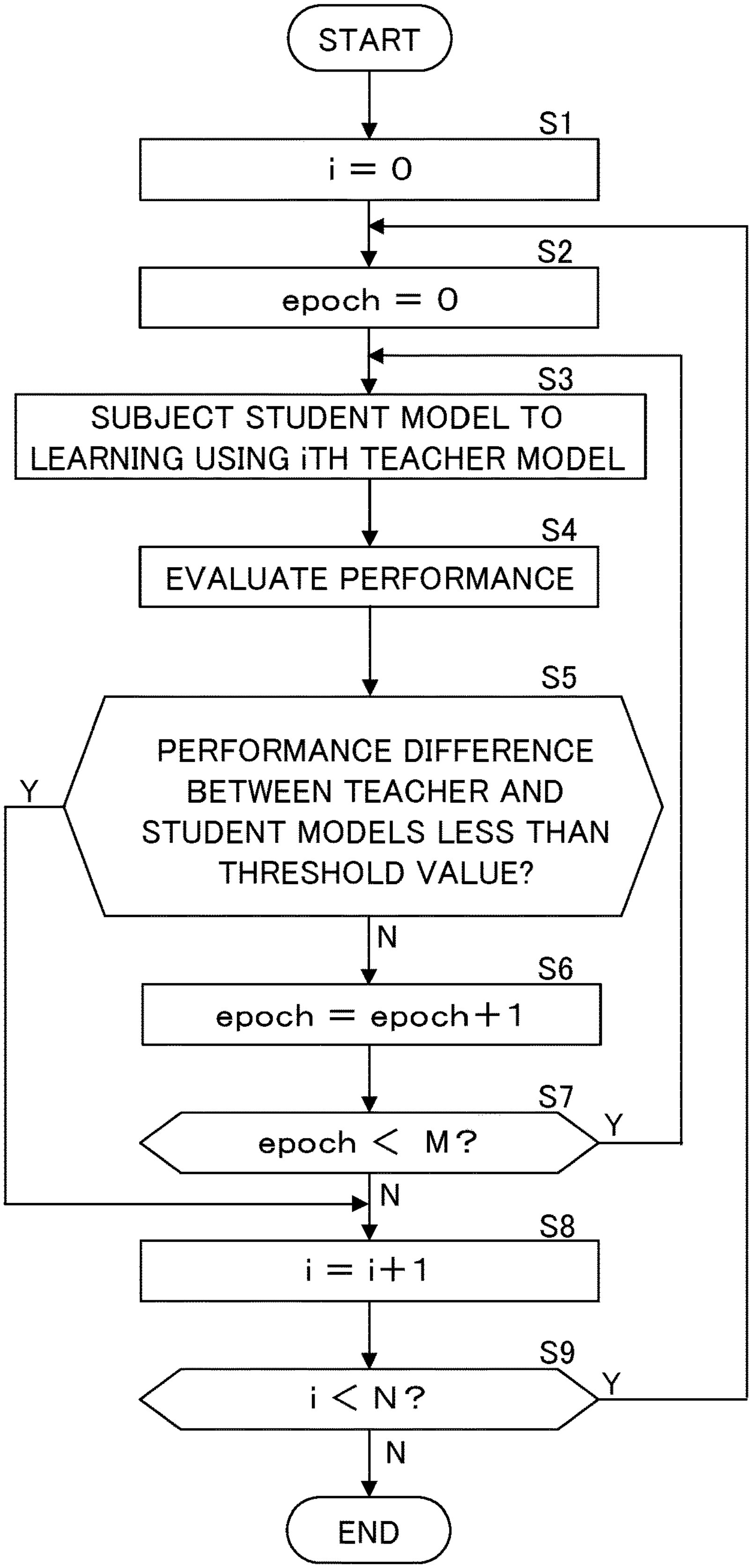
FIG. 5 is a flow chart showing a procedure for training of a student model on the learning apparatus according to the first embodiment.

FIG. 5 is a flow chart showing the procedure for the training of the student model on the learning apparatus 10 according to the first embodiment of the present invention. It should be noted that, before the procedure in FIG. 5 is started, N learned teacher models (where N>1) have been prepared. Any known learning method can be employed for the learning of the teacher model.

At step S1, a variable "i" that corresponds to the number of the teacher model to be used in training is set to zero. The N teacher models are assigned the numbers "0", "1" . . . "N−1" in increasing order of performance. On completion of step S1, the procedure advances to step S2.

At step S2, a variable "epoch" that represents the number of epochs to zero. The maximum value of the number of epochs is set to M. M epochs can be, for example, 100 epochs. On completion of step S2, the procedure advances to step S3.

At step S3, the student model is subjected to learning using the ith teacher model. The learning here is learning employing knowledge distillation as mentioned above. Here, one epoch's worth of learning is performed. Specifically, a set of learning data is divided into a plurality of subsets according to the batch size, and for each subset (at each iteration), learning employing knowledge distillation is performed. For each subset, inference based on the ith teacher model and inference based on the student model are performed. Then, for each subset, by use of the loss function (see expression (3)) obtained through inference using the ith teacher model and the student model, the parameters of the student model are updated. When learning for all the subsets is complete, one epoch's worth of learning is complete. On completion of step S3, the procedure advances to step S4.

At step S4, the performance of the student model that has undergone learning at step S3 is evaluated. In this embodiment, for the student model having undergone learning at step S3, an mAP as an evaluation index for an object detection task is computed. With the mAP computed, the procedure advances to step S5.

At step S5, whether the performance difference between the teacher and student models is less than a threshold value is checked. Specifically, whether the difference between the mAP of the teacher model and the mAP of the student model is less than a threshold value is checked. The threshold value is a predetermined value that is previously stored in the storage 12. If the performance difference is equal to or more than the threshold value (step S5, "No"), the procedure advances to step S6. If the performance difference is less than the threshold value (step S5, "Yes"), the procedure advances to step S8, that is, steps S6 and S7 are skipped.

At step S6, the variable "epoch" is incremented by one. Specifically, if at this time point the variable "epoch" equals zero, it becomes one. This indicates that one epoch's worth of learning (knowledge distillation) using ith teacher model is complete. For another example, if the variable "epoch" equals 50, it becomes 51. This indicates that 51 epochs' worth of learning (knowledge distillation) using ith teacher model is complete. On completion of step S6, the procedure advances to step S7.

At step S7, whether the variable "epoch" is smaller than the maximum number M of epochs is checked. If the variable "epoch" is smaller than the maximum number M of epochs (step S7, "Yes"), the procedure returns to step S3. That is, learning using the ith teacher model is repeated. If the variable "epoch" has reached the maximum number M of epochs (step S7, "No"), the procedure advances to step S8.

At step S8, the variable "i" is incremented by one. That is, the teacher model used in learning is changed from the ith teacher model to the (i+1)th teacher model. For example, if i equals zero, it becomes one, so that a change is made from teacher model 0 to teacher model 1. On completion of step S8, the procedure advances to step S9.

At step S9, whether the variable "i" is smaller than N is checked. That is, it is checked whether all the previously prepared teacher models have been used in the training of the student model. If the variable "i" is smaller than N (at step S9, "Yes"), not all the teacher models have yet been used in the training of the student model, and accordingly the procedure returns the step S2. Thus, by use of a new teacher model with higher performance than the teacher model used in the immediately previous training, the student model starts to be trained by knowledge distillation. The threshold value at step S5 may be changed as teacher models are changes. If the variable "i" has reached N (at step S9, "No"), the training of (learning by) the student model shown in FIG. 5 is complete, and thus a new learned (trained) model is complete.

The learned student model obtained through the procedure in FIG. 5 can acquire performance close to the performance of the teacher model with the highest performance among those previously prepared. Moreover, this learned model has a smaller number of parameters than the teacher model, and thus allows fast processing.

2. Second Embodiment: Next, a learning apparatus according to a second embodiment will be described. The learning apparatus according to the second embodiment, like that according to the first embodiment, trains a student model by knowledge distillation using a teacher model. The hardware configuration of the learning apparatus according to the second embodiment is similar to that of the learning apparatus 10 shown in FIG. 1 according to the first embodiment. Also the functional configuration of the processor provided in the learning apparatus according to the second embodiment is similar to that of the processor shown in FIG. 2 provided in the learning apparatus 10 according to the first embodiment. Differences between the first and second embodiments lie in the detail of the functions of the learning section 113 and the changing section 115 provided in the processor. The following description focuses on those differences and, unless necessary, no description overlapping with the first embodiment will be repeated.

As in the first embodiment, the learning section 113 subjects the student model to learning in such a way as to minimize the loss L given by expression (3). While the weight coefficient λ in expression (3) is constant in the first embodiment, it is not constant in the second embodiment. This is one difference from the first embodiment.

Based on the performance difference between the teacher and student models, the changing section 115 changes the weight coefficient used in calculating the loss in the student model. With this configuration, for example, when the performance of the student model comes close to that of the teacher model, the weight coefficient λ can be changed so that the student model can be subjected to learning under less influence of the teacher model.

Specifically, the loss L in the student model is calculated, as mentioned above, by expression (3). That is, in this embodiment, the weight coefficient is the coefficient λ for adjusting the balance between the loss Luq from the learning data and the loss Ldstl from the teacher model. When the performance of the student model comes close to that of the teacher model, reducing the value of λ permits the student model to be subjected to learning under less influence of the teacher model. It is thus possible to reduce the possibility of the teacher model adversely influencing the learning by the student model.

Figure 6:
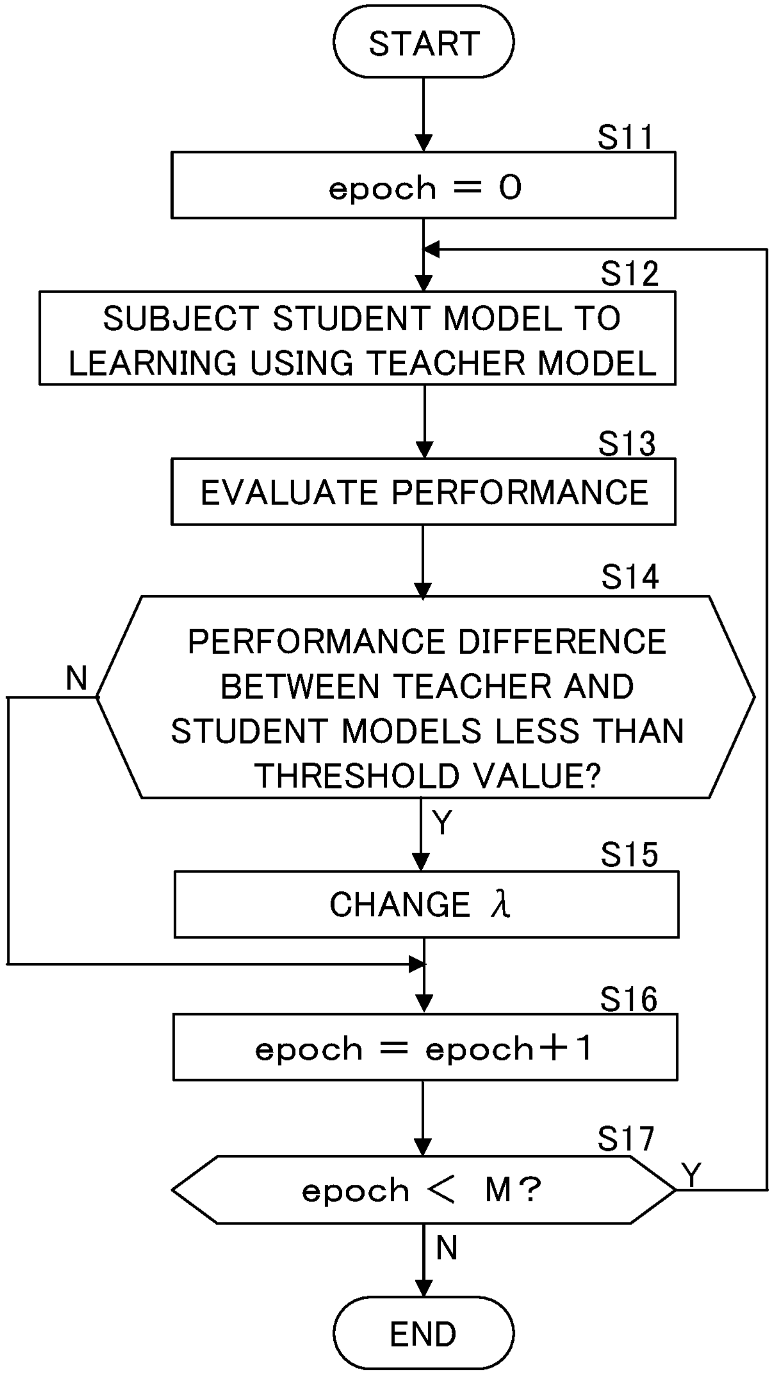
FIG. 6 is a flow chart showing a procedure for training of a student model on the learning apparatus according to a second embodiment.

FIG. 6 is a flow chart showing the procedure for the training of the student model on the learning apparatus according to the second embodiment of the present invention. It should be noted that, before the procedure in FIG. 6 is started, a learned teacher model has been created that has undergone learning by a known method. In this embodiment, unlike in the first embodiment, one teacher model is used.

At step S11, the variable "epoch" that represents the number of epochs is set to zero. The number of epochs planned to be learned (the number of epochs of learning to be gone through) is set to M. The number M of epochs is, for example, 100. On completion of step S11, the procedure advances to step S12.

At step S12, the student model is subjected to learning using the teacher model. The learning here is learning employing knowledge distillation as mentioned above. Here, one epoch's worth of learning is performed. Specifically, a set of learning data is divided into a plurality of subsets according to the batch size, and for each subset (at each iteration), learning employing knowledge distillation is performed. For each subset, inference based on the teacher model and inference based on the student model are performed. Then, for each subset, by use of the loss function (see expression (3)) obtained through inference using the teacher model and the student model, the parameters of the student model are updated. When learning for all the subsets is complete, one epoch's worth of learning is complete. On completion of step S12, the procedure advances to step S13.

At step S13, the performance of the student model that has undergone learning at step S12 is evaluated. In this embodiment, for the student model having undergone learning at step S12, an mAP as an evaluation index for an object detection task is computed. With the mAP computed, the procedure advances to step S14.

At step S14, whether the performance difference between the teacher and student models is less than a threshold value is checked. Specifically, whether the difference between the mAP of the teacher model and the mAP of the student model is less than a threshold value is checked. The threshold value is a predetermined value that is previously stored in the storage 12. If the performance difference is less than the threshold value (step S14, "Yes"), the procedure advances to step S15. If the performance difference is equal to or more than the threshold value (step S14, "No"), the procedure advances to step S16, that is, step S15 is skipped.

At step S15, the weight coefficient λ in expression (3) is changed. Specifically, the value of the weight coefficient λ is reduced. For example, the current value of λ is multiplied by a constant value (e.g., 0.5) smaller than one. That is, the weight of the term represented by λ×Ldstl in expression (3) is reduced. As a result, the weight of the loss Ldstl from the teacher model in the loss L in the student model is reduced, and the student model can be subjected to learning under less influence of the teacher model. On completion of step S15, the procedure advances to step S16.

A configuration is also possible where, when the weight coefficient λ is changed at step S15, the threshold value at step S14 is changed accordingly. Instead, even after the weight coefficient λ is changed, the threshold value may be kept constant. In this case, after the weight coefficient λ is changed for the first time, the weight coefficient λ decreases gradually every epoch. Instead, a configuration is also possible where, after the weight coefficient λ is changed once, the weight coefficient λ is thereafter kept unchanged.

At step S16, the variable "epoch" is incremented by one. Specifically, if at this time point the variable "epoch" equals zero, it becomes one. This indicates that one epoch's worth of learning (knowledge distillation) using the teacher model is complete. For another example, if the variable "epoch" equals 50, it becomes 51. This indicates that 51 epochs' worth of learning (knowledge distillation) using the teacher model is complete. On completion of step S16, the procedure advances to step S17.

At step S17, whether the variable "epoch" is smaller than the number M of epochs planned to be learned is checked. If the variable "epoch" is smaller than the number M of epochs (step S17, "Yes"), the procedure returns to step S12, where learning is repeated. If the variable "epoch" has reached the number M of epochs (step S17, "No"), the training of (learning by) the student model shown in FIG. 6 is complete, and thus a new learned model is complete.

The learned student model obtained through the procedure in FIG. 6 is unlikely to be adversely influenced by the teacher model, and its performance can be improved appropriately by knowledge distillation. Moreover, this learned model has a smaller number of parameters than the teacher model, and thus allows fast processing.

As will be understood from the above, also in the learning method according to the second embodiment, the loss L in the student model is computed by use of the loss Luq from the learning data and the loss Ldstl from the teacher model. Moreover, in the learning method according to the second embodiment, the weight coefficient λ for adjusting the balance between the loss Luq from the learning data and the loss Ldstl from the teacher model is changed with predetermined timing in the training of the student model. With this configuration, it is possible to train the student model while adjusting the influence of the teacher model on the student model in training.

As described above, in this embodiment, the predetermined timing is when the performance difference between the teacher and student models becomes smaller than a predetermined threshold value. Thus, when the performance of student model comes close to that of teacher model, the weight coefficient λ can be changed so that the student model can be subjected to learning under less influence of the teacher model As a modified example, the predetermined timing may be every predetermined number of epochs. With this configuration, the weight coefficient λ can be reduced every predetermined number of epochs, and thereby the influence of the teacher model can be reduced gradually in accordance with the progress of learning employing knowledge distillation.

Figure 7:
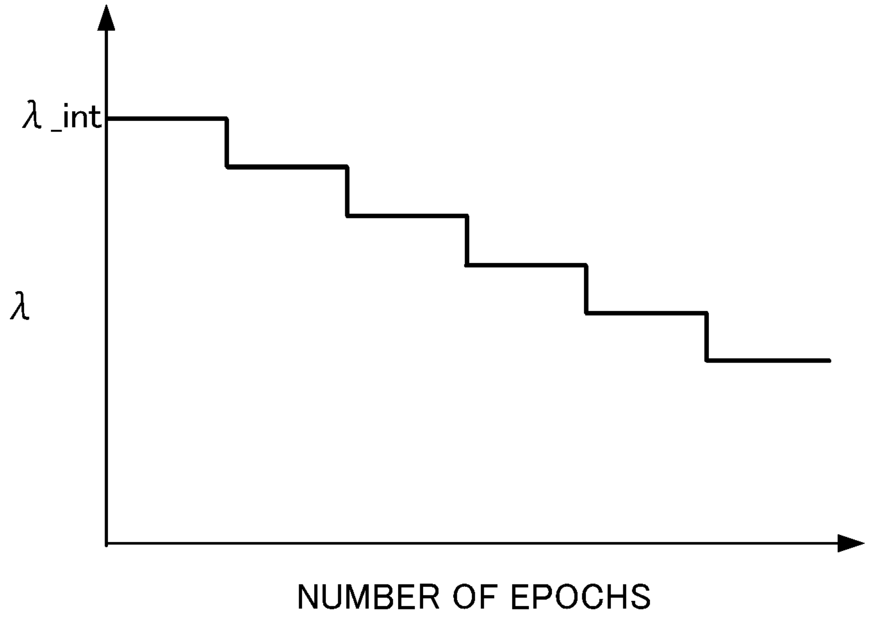
FIG. 7 is a diagram showing an example where a weight coefficient $\lambda$ is reduced every plurality of epochs.

Every predetermined number of epochs may be every plurality of epochs or every epoch. FIG. 7 is a diagram showing an example where the weight coefficient λ is reduced every plurality of epochs. In FIG. 7, the horizontal line represents the number of epochs, and the vertical line represents the value of λ. In the example shown in FIG. 7, the value of λ in relation to the number of epochs can be given by expression (4) below.

$$\lambda = \lambda\_\mathrm{int} * \left(0.9^\wedge(\mathrm{epoch\ mod\ 50})\right) \tag{4}$$

Here, the symbol λ_int represents the initial value of λ. The symbol epoch represents the current number of epochs. In the example given by expression (4), the weight coefficient is multiplied by a factor of 0.9 every 50 epochs. The factor 0.9 is merely illustrative, and may instead be any value smaller than one.

Figure 8:
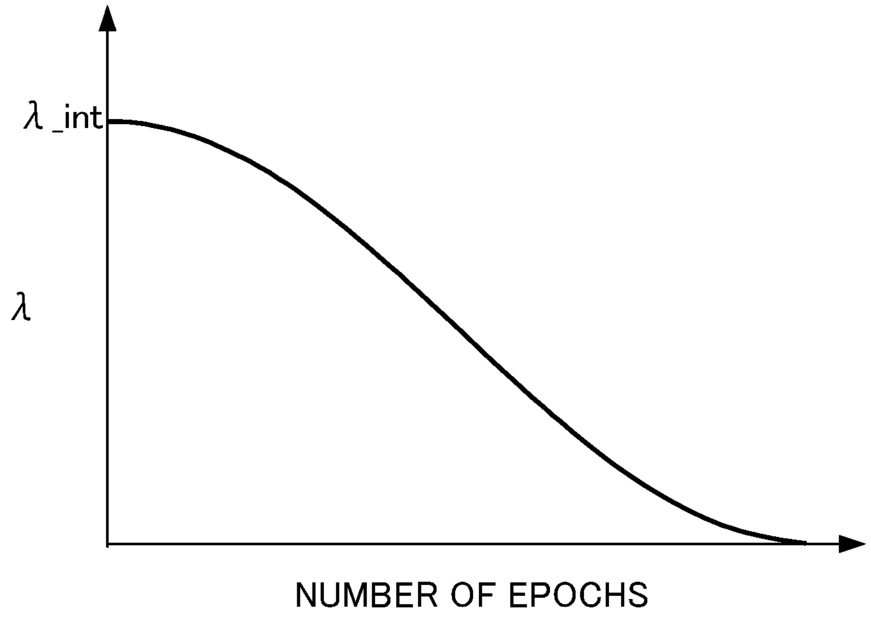
FIG. 8 is a diagram showing an example where a weight coefficient $\lambda$ is reduced every epoch.

FIG. 8 is a diagram showing an example where the weight coefficient λ is reduced every epoch. In FIG. 8, the horizontal line represents the number of epochs, and the vertical line represents the value of λ. In the example shown in FIG. 8, the value of λ in relation to the number of epochs can be given by expression (5) below.

$$\lambda = \lambda\_\mathrm{int} * \left(\cos(\pi * \mathrm{epoch}/M) + 1\right)/2 \tag{5}$$

Here, the symbol λ_int represents the initial value of λ. The symbol epoch represents the current number of epochs. The symbol M represents the number of epochs planned to be learned. In the example shown in FIG. 8, λ is subjected to what is called cosine annealing so as to be reduced continuously (every epoch).

3. Third Embodiment: Next, a learning apparatus according to a third embodiment will be described. The learning apparatus according to the third embodiment, like that according to the first embodiment, trains a student model by knowledge distillation using a teacher model. The hardware configuration of the learning apparatus according to the third embodiment is similar to that of the learning apparatus 10 shown in FIG. 1 according to the first embodiment. For any features shared with the first embodiment, unless necessary, no overlapping description will be repeated. In this embodiment, the teacher and student models are models for object detection. The teacher model has higher performance than the student model. For example, the rate of object detection is higher with the teacher model than with the student model. According to this embodiment, it is possible to create, by knowledge distillation, a high-performance learned model capable of fast object detection. In this embodiment, unlike in the first embodiment, one teacher model is used.

Figure 9:
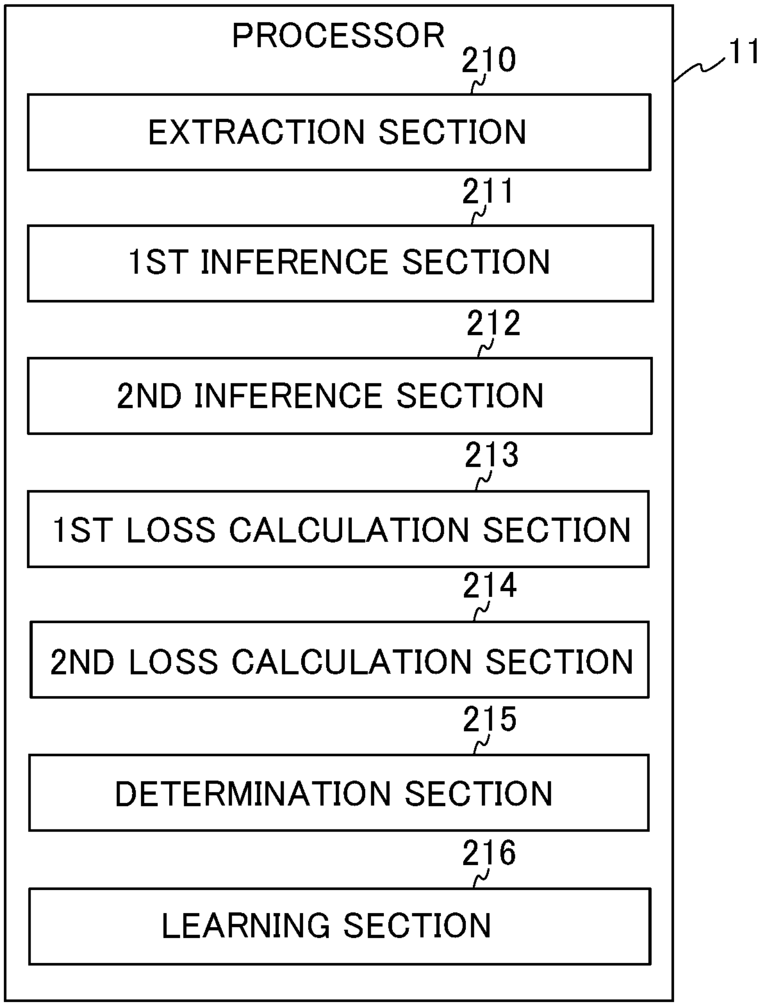
FIG. 9 is a block diagram showing a functional configuration of a processor provided in a learning apparatus according to a third embodiment.

FIG. 9 is a block diagram showing the functional configuration of a processor 11 provided in the learning apparatus according to the third embodiment of the present invention. The functions of the processor 11 are carried out by the processor 11 performing arithmetic operations according to a program stored in the storage 12. As shown in FIG. 9, in this embodiment, the processor 11 includes, as its functional blocks, an extraction section 210, a first inference section 211, a second inference section 212, a first loss calculation section 213, a second loss calculation section 214, a determination section 215, and a learning section 216. In other words, the learning apparatus 10 includes an extraction section 210, a first inference section 211, a second inference section 212, a first loss calculation section 213, a second loss calculation section 214, a determination section 215, and a learning section 216. The extraction section 210 generates a minibatch by extracting, out of a plurality of pieces of previously prepared learning data with correct answer labels, a predetermined number of pieces of learning data.

The first inference section 211 performs inference with respect to the input learning data by using a learned teacher model. The function of the first inference section 211 is carried out by the processor 11 reading in the teacher model stored in the storage 12. The inference yields an inference result as a final result of inference, a feature map as an intermediate output, or the like. In this embodiment, the learning data is image data, and the first inference section 211 performs object detection with respect to the input image data. The result of inference by the first inference section 211 includes identifications of the types and locations of objects. Object types include, for example, pedestrian, bicycle, automobile, traffic signal, and the like. Locations are identified by use of bounding boxes.

The second inference section 212 performs inference with respect to the input learning data by using the student model that is the target of training based on the teacher model. The function of the second inference section 212 is carried out by the processor 11 reading in the student model stored in the storage 12. The inference yields an inference result as a final result of inference, a feature map as an intermediate output, or the like. The parameters of the student model are updated regularly through leaning. In this embodiment, as described above, the learning data is image data, and the second inference section 212 performs object detection with respect to the input image data. The result of inference by the second inference section 212 includes, as with the first inference section 211, identifications of the types and locations of objects.

The first loss calculation section 213 computes a first loss Loss_1, which is the loss in the inference result based on the teacher model from the learning data. The first loss Loss_1 is the error (hereinafter referred to also as inference error) between the inference result based on the teacher model and the correct answer label in the learning data. In this embodiment, the learning task is object detection, and the first loss Loss_1 includes, for example, a classification loss and a bounding box regression loss. The first loss Loss_1 can be computed, for example, by the expression obtained by replacing Luq in expression (2) noted above with Loss_1. That is, the first loss Loss_1 can be computed by summing up the first to fifth terms in the right side of expression (2) noted above.

The second loss calculation section 214 computes a second loss Loss_2, which is the loss in the inference result based on the student model from the learning data. The second loss Loss_2 is the error (inference error) between the inference result based on the student model and the correct answer labels in the learning data. In this embodiment, the learning task is object detection, and the second loss Loss_2 includes, for example, a classification loss and a bounding box regression loss. The second loss Loss_2, like the first loss Loss_1, can be computed, for example, by the expression obtained by replacing Luq in expression (2) noted above with Loss_2. That is, the second loss Loss_2 can be computed by summing up the first to fifth terms in the right side of expression (2) noted above.

The determination section 215 determines, based on the first and second losses Loss_1 and Loss_2, whether to perform training using the teacher model. That is, in the learning method according to this embodiment, whether to perform training using the teacher model is determined based on the first loss Loss_1 in the inference result based on the teacher model from the learning data and the second loss Loss_2 in the inference result based on the student model from the learning data. With this configuration, it is possible not to train the student model by using the teacher model when, for example, the inference error of the teacher model is larger than the inference error of the student model. That is, it is possible to suppress distillation of incorrect knowledge of the teacher model into the student model.

Specifically, if the first loss Loss_1 is smaller than the second loss Loss_2, the determination section 215 determines to perform training using the teacher model. In this way, it is possible to appropriately distill into the student model the knowledge of the teacher model that is superior than that of the student model, and thereby to appropriately improve the performance (such as the object detection rate) of the student model.

On the other hand, if the first loss Loss_1 is equal to or larger than the second loss Loss_2, the determination section 215 determines not to perform training using the teacher model. It is thus possible to suppress distillation of incorrect knowledge of the teacher model into the student model.

The learning section 216 subjects the student model to learning by using the loss function. The learning section 216 subjects the student model to learning in such a way as to minimize the loss calculated by the loss function. Specifically, the learning section 216 updates the parameters of the student model by error backpropagation. In this embodiment, the learning section 216 changes the manner of the learning by the student model in accordance with the result of the determination by the determination section 215.

When it is determined to perform training using the teacher model, the learning section 216 computes the loss Loss_s in the student model by using the second loss Loss_2 and the loss (distillation loss) Ldstl from the teacher model. The learning section 216 subjects the student model to learning based on the computed loss Loss_s in the student model. With this configuration, it is possible to subject the student model to learning using both the teacher model, with performance superior to that of the student model, and the learning data, and thus to make the student model a high-performance learned model.

The distillation loss Ldstl is the error between the teacher and student models in the inference result or in the intermediate-layer feature map (intermediate output). In this embodiment, the distillation loss Ldstl is the error between the feature map of the teacher model and the feature map of the student model. The distillation loss Ldstl may be, for example, an L2 loss that is given by expression (1) noted above. The distillation loss Ldstl, however, may be other than an L2 loss; it may be, for example, a KL divergence that indicates the loss in output distribution between the teacher and student models.

On the other hand, when it is determined not to perform training using the teacher model, the learning section 216 subjects the student model to learning using the second loss Loss_2 as the loss Loss_s in the student model. In this case, the student model is subjected to learning using learning data alone; it is however possible to proceed with leaning while excluding the teacher model that may distill incorrect knowledge, and thus to suppress degradation of the performance of the student model.

Figure 10:
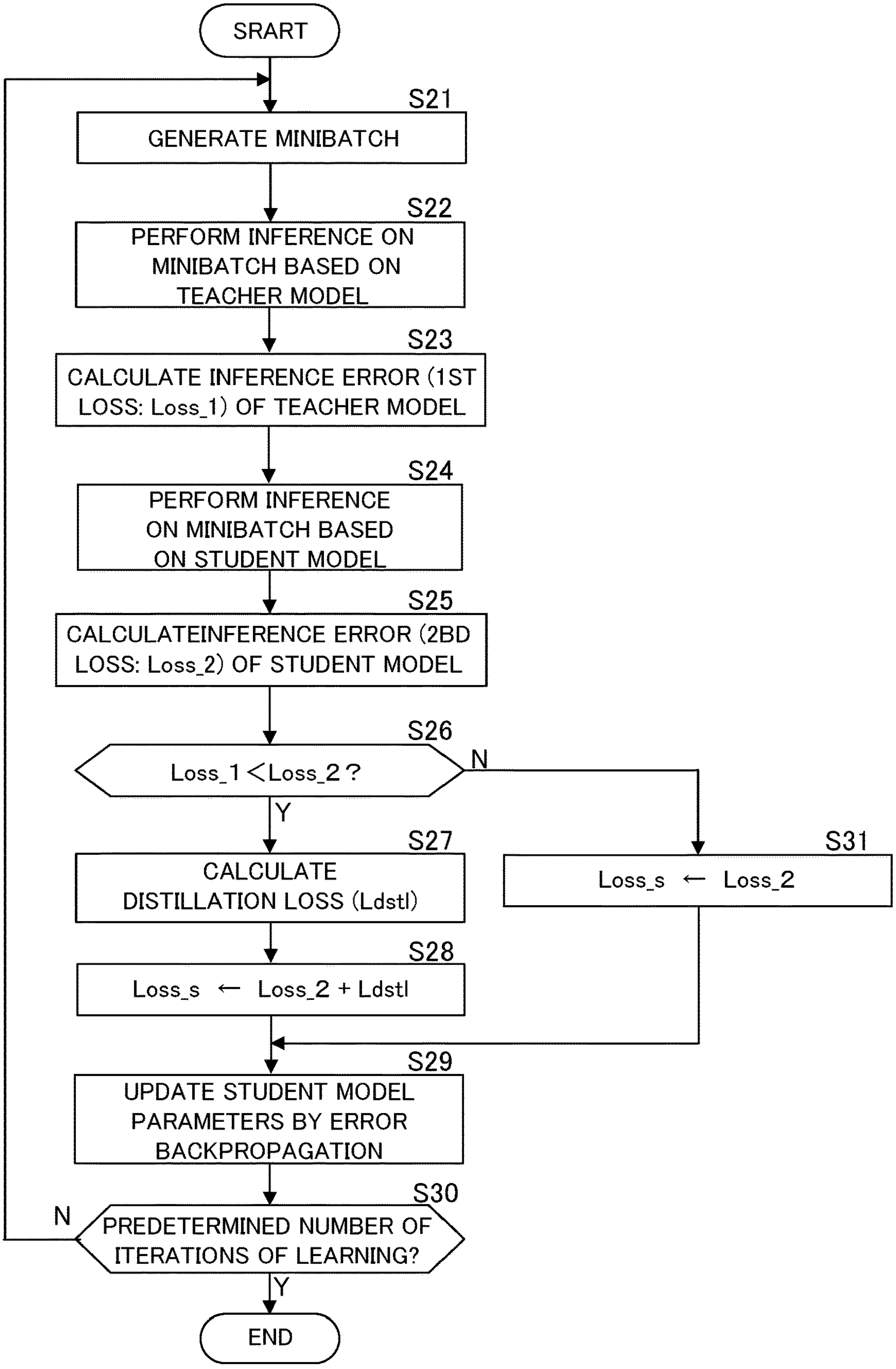
FIG. 10 is a flow chart showing a procedure for training of a student model on a learning apparatus according to the third embodiment.

FIG. 10 is a flow chart showing the procedure for the training of the student model on the learning apparatus 10 according to the third embodiment of the present invention. It should be noted that, before the procedure in FIG. 10 is started, a learned teacher model has been created that has undergone learning by a known method.

At step S21, the extraction section 210 generates a minibatch by sampling (extracting), out of a plurality of pieces of previously prepared learning data with correct answer labels, a predetermined number of pieces of data. The learning data contains, for example, a plurality of pieces of image data. These pieces of image data contained in the learning data have correct answer labels respectively. The predetermined number is any number determined as necessary. For example, in a case where the previously prepared learning data (image data) contains a total of 10000 pieces, the predetermined number is set to 100 for instance. On completion of step S21, the procedure advances to step S22. The minibatch may be generated on an apparatus separate from the learning apparatus 10. That is, a configuration is also possible where data that constitutes a minibatch is fed to the learning apparatus 10 as necessary. With this configuration, the learning apparatus 10 does not need to include the extraction section 210.

At step S22, the first inference section 211 performs inference. Specifically, the parameters of the teacher model as a learned model are read in from the storage 12 to the processor 11, and inference using the teacher model is performed with respect to the minibatch. The inference yields an inference result as a finial result of inference with respect to each of the pieces of learning data constituting the minibatch. On completion of step S22, the procedure advances to step S23.

At step S23, for each of the pieces of learning data constituting the minibatch, the first loss calculation section 213 calculates a first loss Loss_1 by using the inference result obtained at step S22 and the correct answer label. The first loss Loss_1 is the inference error of the teacher model. The first loss Loss_1 can be computed by the expression obtained by replacing Luq in expression (2) noted above with Loss_1. On completion of step S23, the procedure advances to step S24.

At step S24, the second inference section 212 performs inference. Specifically, the parameters of the student model as the target to be subjected to learning are read in from the storage 12 to the processor 11, and inference using the student model is performed with respect to the minibatch. The inference yields an inference result as the final result of inference with respect to each of the pieces of learning data constituting the minibatch. On completion of step S24, the procedure advances to step S25.

At step S25, for each of the pieces of learning data constituting the minibatch, the second loss calculation section 214 calculates a second loss Loss_2 by using the inference result obtained at step S24 and the correct answer label. The second loss Loss_2 is the inference error of the student model. The second loss Loss_2 can be computed by the expression obtained by replacing Luq in expression (2) noted above with Loss_2. On completion of step S25, the procedure advances to step S26.

While this embodiment deals with a configuration where inference and loss calculation using the teacher model are performed before inference and loss calculation using the student model, this is merely illustrative. A configuration is also possible where, for example, inference and loss calculation using the student model are performed before inference and loss calculation using the teacher model.

At step S26, the determination section 215 checks whether the first loss Loss_1 is smaller than the second loss Loss_2. If the first loss Loss_1 is smaller than the second loss Loss_2 (step S26, "Yes"), the procedure advances to step S27. On the other hand, if the first loss Loss_1 is equal to or larger than the second loss Loss_2 (step S26, "No"), the procedure advances to step S31.

At step S27, the distillation loss Ldstl is calculated. The distillation loss Ldstl can be computed by expression (1) noted above. The inference error of the teacher model is smaller than the inference error of the student model, and inference based on the teacher model is reliable; accordingly, to perform knowledge distillation using the teacher model, the distillation loss Ldstl is calculated. On completion of step S27, the procedure advances to step S28.

At step S28, the loss obtained by use of the second loss Loss_2 and the distillation loss Ldstl is taken as the loss Loss_s in the student model. A configuration is also possible where the loss Loss_s in the student model is given specifically by expression (6) below.

$$\mathrm{Loss\_s} = \mathrm{Loss\_2} + \lambda \cdot Ldstl \tag{6}$$

The symbol λ represents the weight coefficient for adjusting the balance between the second loss Loss_2 and the distillation loss Ldstl. The weight coefficient λ is a constant determined as desired. On completion of step S28, the procedure advances to step S29.

At step S29, the learning section 216 subjects the student model to learning in such a way as to minimize the loss Loss_s in the student model. Specifically, the learning section 216 updates the parameters of the student model by error backpropagation. On completion of step S29, the procedure advances to step S30.

At step S30, it is checked whether a predetermined number of iterations of learning have been performed. The predetermined number of iterations is set previously in accordance with the number of pieces of learning data and the like. If the predetermined number of iterations of learning have been performed (step S30, "Yes"), the training of (learning by) the student model shown in FIG. 10 is complete. With this, the learning by the student model may be considered complete and a learned model may be considered complete. A configuration is also possible where the learning procedure shown in FIG. 10 is repeated a predetermined number of times (number of epochs) before leaning is considered complete (a learned model is considered complete).

At step S31, the second loss Loss_2 is taken as the loss Loss_s in the student model. This means that, since the inference error of the teacher model is larger than the inference error of the student model and inference based on the teacher model is not reliable, no knowledge distillation using the teacher model will be performed. The student model will be subjected to learning using only learning data with correct answer labels; that is, no training will be performed by use of the teacher model. On completion of step S31, the procedure advances to step S29. Thus the student model is subjected to learning in such a way as to minimize the second loss Loss_2 (=Loss_s) by error back-propagation.

With the learning method shown in FIG. 10, only when inference based on the teacher model is reliable is the knowledge of the teacher model distilled into the student model. It is thus possible to appropriately distill the knowledge of the teacher model into the student model, and thereby to improve the performance of the student model. The learned student model created by use of the learning method shown in FIG. 10 has a smaller number of parameters than the teacher model, and thus allows fast execution of high-performance processing.

4. Modified Examples: The configurations described above are, in outline, as follows. According to the first embodiment, based on the performance difference between the teacher and student models, the processor 11 determines whether to change teacher models. According to the second embodiment, based on the performance difference between the teacher and student models, the processor 11 changes the weight coefficient in calculating the loss in the student model. According to the third embodiment, based on the performance difference between the teacher and student models (the difference between the first and second losses), the processor 11 determines whether to perform training using the teacher model.

A configuration is possible where the processor 11 makes at least one of a determination, based on the performance difference between the teacher and student models, of whether to use the teacher model and a determination, based on the performance difference between the teacher and student, of whether to change the weight coefficient in calculating the loss in the student model. The determination of whether to use the teacher model includes a determination of whether to change teacher models or a determination of whether to perform training using the teacher model.

In the configurations described above, the processor 11 may be configured as follows: first, to determine the performance difference, the processor 11 computes a first loss, which is the loss in the inference result based on the teacher model with respect to the learning data, and a second loss, which is the loss in the inference result based on the student model with respect to the learning data; then, if the first loss is smaller than the second loss and the difference between the first and second losses is equal to or larger than a predetermined threshold value, the processor 11 determines to perform training using the teacher model; on the other hand, if the first loss is smaller than the second loss and the difference between the first and second losses is less than a predetermined threshold value, or if the first loss is equal to or larger than the second loss, the processor 11 changes teacher models or changes the weight coefficient in calculating the loss in the student model. The threshold value is, for example, any value that is determined by trial and error.

5. Notes: The various technical features disclosed herein may be implemented in any manners other than in the embodiments described above, and allow for many modifications without departure from the spirit of their technical ingenuity. That is, the embodiments described above should be understood to be in every aspect illustrative and not restrictive, and the technical scope of the present invention is defined not by the description of the embodiments given above but by the appended claims and encompasses any modifications within a scope and sense equivalent to those claims. As necessary, any two or more of the embodiments and modified examples may be implemented in combination unless infeasible.

What is claimed is:

1. A learning method performed by a processor to perform training of a student model with a teacher model, comprising:

continuously training the student model by:

during the training, determining a loss to update a parameter of the student model, the loss including a loss in an inference result based on the teacher model with respect to learning data that is image data, the loss in the inference result including recognition of the type and position of an object, and the position is identified with a BBOX (bounding box);

after the training of the student model with the teacher model, determining a performance difference between the teacher model and the student model; and when the performance difference becomes smaller than a predetermined threshold value, changing the teacher model used in training the student model to a teacher model with higher performance than the teacher model currently used and then training the student model.

2. A learning method performed by a processor to perform training of a student model with a teacher model, comprising:

continuously training the student model by:

during the training, determining a loss in the student model according to expression (A) below to update a parameter of the student model;

after the training, comparing performance of the student model with performance of the teacher model; and performing the training while decreasing a value of 2 in expression (A) as the performance of the student model approaches the performance of the teacher model, $$L = Leq + \lambda \cdot Ldstl \quad \text{(A)}$$

where

L represents the loss in the student model;

Leq represents a loss from learning data;

Ldstl represents a loss from the teacher model; and

λ represents a weight coefficient for adjusting a balance between the loss from learning data and the loss from the teacher model, wherein the learning data is image data and the student model and the teacher model are models for object detection that include identifications of types and locations of objects, wherein a loss in an inference result based on the teacher model with respect to the learning data includes recognition of the type and position of an object, and the position is identified with a BBOX (bounding box).

3. The learning method according to claim 2, wherein the loss from the teacher model is an error in the inference result, or an error in an intermediate-layer feature map, between the teacher and student models.

4. The learning method according to claim 2, wherein λ is decreased when a performance difference between the teacher and student models becomes smaller than a predetermined threshold value.

5. The learning method according to claim 2, wherein λ is decreased every predetermined number of epochs.

6. A learning method performed by a processor to perform training of a student model with a teacher model, comprising:

continuously training the student model by:

computing:

a first loss, which is a loss in an inference result based on the teacher model with respect to learning data, and a second loss, which is a loss in an inference result based on the student model with respect to the learning data;

if the first loss is smaller than the second loss, computing a loss in the student model by using the second loss and a loss from the teacher model and updating a parameter of the student model based on the computed loss; and if the first loss is equal to or larger than the second loss, updating the parameter of the student model with the second loss taken as a loss in the student model, wherein the learning data is image data and the student model and the teacher model are models for object detection that include identifications of types and locations of objects, and wherein a loss in an inference result based on the teacher model with respect to the learning data includes recognition of the type and position of an object, and the position is identified with a BBOX (bounding box).

7. A learning method performed by a processor to perform training of a student model with a teacher model, comprising:

continuously training the student model by:

computing:

a first loss, which is a loss in an inference result based on the teacher model with respect to learning data, and a second loss, which is a loss in an inference result based on the student model with respect to the learning data, if the first loss is smaller than the second loss and a difference between the first and second losses is equal to or larger than a predetermined threshold value, to determine to perform training using the teacher model, and if the first loss is smaller than the second loss and the difference between the first and second losses is less than the predetermined threshold value, or if the first loss is equal to or larger than the second loss, changing the teacher model or changing a weight coefficient for adjusting a balance between a loss from learning data and a loss from the teacher model, wherein the learning data is image data and the student model and the teacher model are models for object detection that include identifications of types and locations of objects, and wherein a loss in an inference result based on the teacher model with respect to the learning data includes recognition of the type and position of an object, and the position is identified with a BBOX (bounding box).

* * * * *